United States Patent [19]
Foster, Jr.

[11] Patent Number: 5,528,623
[45] Date of Patent: Jun. 18, 1996

[54] CORDLESS TELEPHONE SYSTEM HAVING AUTOMATIC CONTROL OF TRANSMITTER POWER AND FREQUENCY IN RESPONSE TO CHANGING CONDITIONS

[75] Inventor: Robert B. Foster, Jr., Bellevue, Wash.

[73] Assignee: American Wireless Corporation, Bellevue, Wash.

[21] Appl. No.: 329,467

[22] Filed: Oct. 26, 1994

[51] Int. Cl.$^6$ ............................ H04B 1/713; H04M 11/00
[52] U.S. Cl. ................................................ 375/202; 379/61
[58] Field of Search ................................. 379/61, 58, 59, 379/63; 375/200, 202, 205

[56] References Cited

U.S. PATENT DOCUMENTS

| | | | |
|---|---|---|---|
| 5,278,992 | 1/1994 | Su et al. | |
| 5,323,447 | 6/1994 | Gillis et al. | 379/61 |
| 5,418,839 | 5/1995 | Knuth et al. | 379/61 |

Primary Examiner—Stephen Chin
Assistant Examiner—Kevin Kim
Attorney, Agent, or Firm—Fulbright & Jaworski

[57] ABSTRACT

A communications system includes at least two communications units, each communication unit including a transmitter capable of transmitting to the other unit at different power levels and on different frequencies, the power levels and frequencies of transmission being controlled by a mode control unit in response to indicators of transmission quality and reliability, wherein the mode control unit initially establishes a minimum power output of the transmitter at a fixed frequency to establish communications and if reliable communications cannot be maintained, increasing the level of output power of the transmitter until reliable communications are established as indicated by signals returned from another unit in the communications system, and wherein the mode control unit changes the output frequency of the transmitter from a single frequency mode to a time division spread spectrum mode if the required power output level of the transmitter exceeds a first predetermined threshold.

13 Claims, 6 Drawing Sheets

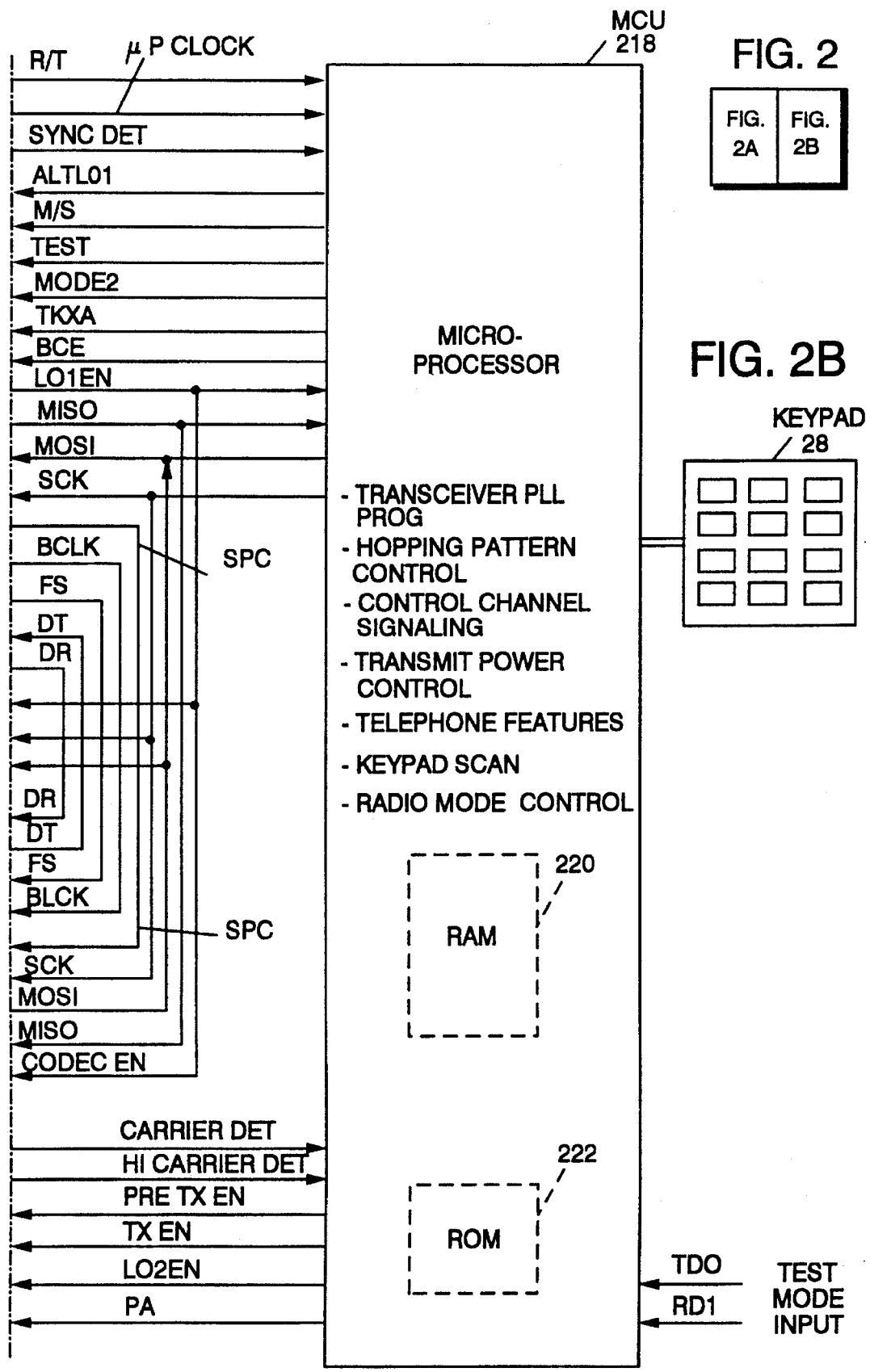

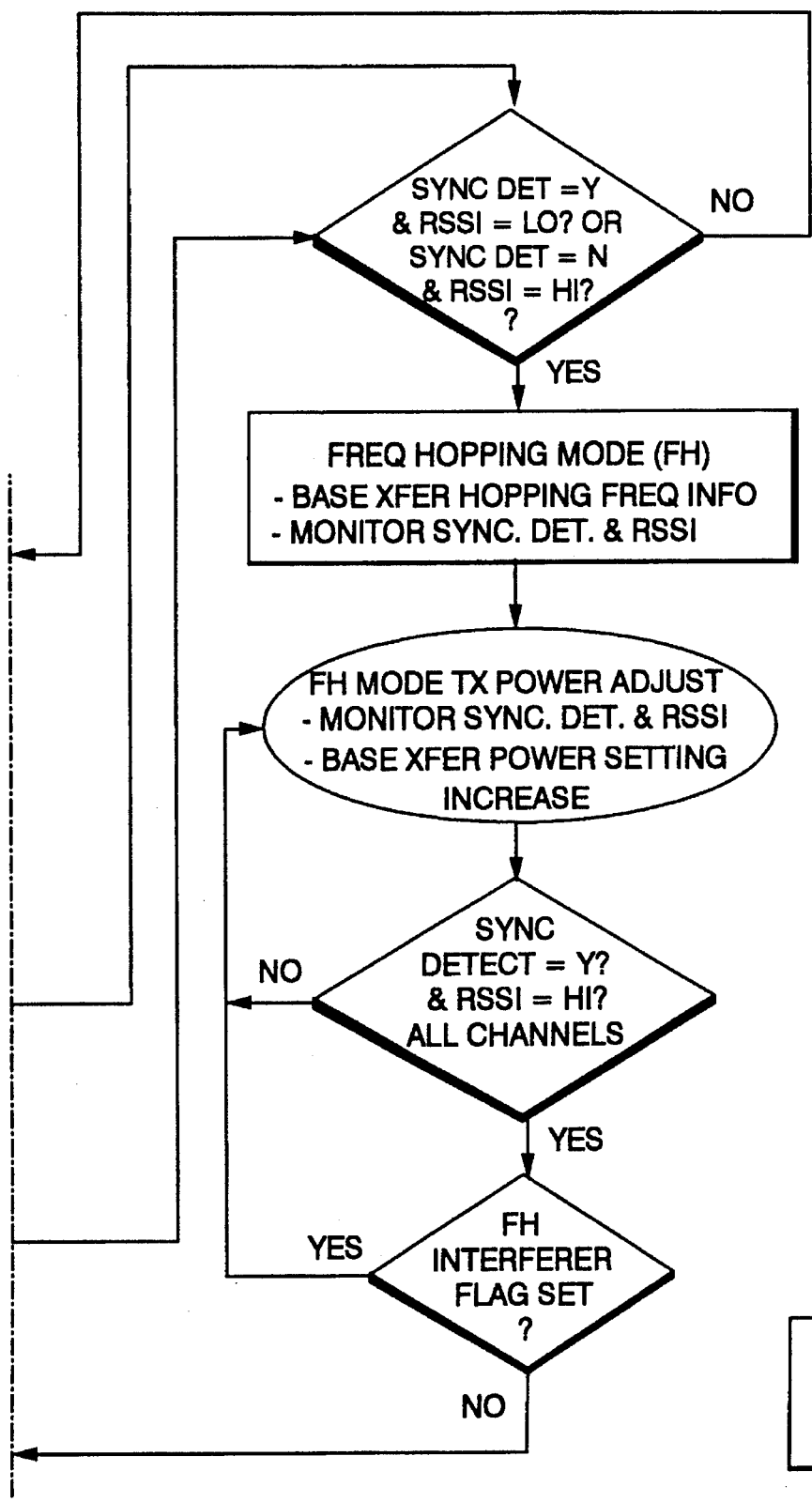

CORDLESS TELEPHONE SYSTEM HAVING AUTOMATIC CONTROL OF TRANSMITTER POWER AND FREQUENCY IN RESPONSE TO CHANGING CONDITIONS

TECHNICAL FIELD OF THE INVENTION

The present invention relates to telephone systems and more particularly to telephone systems including telephone devices capable of cordless handset operation remote from a base station.

BACKGROUND OF THE INVENTION

The Federal Communications Commission ("CFCC") has established a cordless telephone service in the 900 Mhz frequency band and has established rules regarding power levels for transmitters employed in such cordless telephone systems and spectrum spreading techniques (frequency hopping) depending on preestablished power levels. Under the rules established by the FCC, a first power level of a maximum of one milliwatt (50 µv/m measured at 3 m) is established for single frequency operation of cordless telephone systems in the 900 Mhz band. If the transmitting power of each telephone unit does not exceed one milliwatt of power, a single frequency within the allocated frequency band may be used for communication between the base station and the remote unit.

If for reliable communication between the base station and the remote unit a power level exceeding milliwatt but less than a maximum of one watt is required, a spectrum spreading or "frequency hopping" technique must be employed to minimize interference with other devices using the frequency band.

A dilemma is presented which requires choices to be made as between low power single frequency operation of the cordless telephone system which might provide spectrum space for a larger number of simultaneous users of the frequency band or a high power spread spectrum technique which provides for reliable communication between the base station and the remote unit at greater distances but with the disadvantage that fewer users can reliably use the allocated frequency band without interference from the higher power transmissions. Further, the higher power transmissions in the spread spectrum technique may also cause interference to users employing a low power single frequency transmission system.

SUMMARY OF THE INVENTION

Therefore, it is an object of the present invention to communicate between a base station and a remote unit in a telephone system employing automatic control of power level and frequency of transmission based on indicia of quality of communication between the remote cordless unit and the base station.

Accordingly, a communications system includes at least two communications units, each communication unit including a transmitter capable of transmitting to the other unit at different power levels and on different frequencies, the power levels and frequencies of transmission being controlled by a mode control unit in response to indicators of transmission quality and reliability, wherein the mode control unit initially establishes a minimum power output of the transmitter at a fixed frequency to establish communications and if reliable communications cannot be maintained, increasing the level of output power of the transmitter until reliable communications are established as indicated by signals returned from another unit in the communications system, and wherein the mode control unit changes the output frequency of the transmitter from a single frequency mode to a time division spread spectrum mode if the required power output level of the transmitter exceeds a first predetermined threshold.

Another unit in the communications system has all the features and functions of the first unit described above and all units also include a receiver for receiving the transmissions from the other unit, the receiver having a controller for establishing communications and generating signals to be transmitted to the first transmitting unit indicating the quality and reliability of communications between the two units.

The mode control unit of each communications unit in the communications system employs a frequency hopping time divided transmission technique to maintain communications between two units in the communications system when the power level of the transmitter exceeds a predetermined threshold, for example, one milliwatt, to maintain reliable communication. The frequency hopping frequency control technique employs a narrow band frequency modulation (FM) or frequency shift keying (FSK) transmission mode for efficient spectrum utilization.

Thus, a communications system, according to the present invention, has communications units which are capable of operating in either low power single frequency mode or high power frequency hopping mode without modification of the units.

It is an additional feature of the communications system according to the present invention that bit and frame timing recovery may be performed independent of the spectrum spreading (frequency hopping) function.

The foregoing has outlined broadly the features and technical advantages of the present invention in order that the detailed description of the preferred embodiment of the invention which follows may be better understood. The preferred embodiment of the invention will be described with reference to the drawing.

BRIEF DESCRIPTION OF THE DRAWING

For a more complete understanding of the present invention, and the advantages thereof, reference is now made to the following descriptions taken in conjunction with the accompanying drawings, in which:

FIGS. 2, 2A and 2B are block diagram of one of the communications units of FIG. 1 in accordance with a preferred embodiment of the present invention.

FIG. 3 is a time, amplitude and frequency chart showing an example of single frequency and frequency hopping mode transmission control, wherein:

FIGS. 3A 1-3 show the non-hopping or single frequency transmission control mode; and FIGS. 3B 1-3 show the frequency hopping transmission control mode.

FIGS. 4A and 4B are flow chart of the operation of the mode control unit of a communications unit in accordance with the present invention describing the operation of the power and frequency control for each transmitter in the communications system according to the present invention.

DETAILED DESCRIPTION OF A PREFERRED EMBODIMENT OF THE INVENTION

Figure 1:
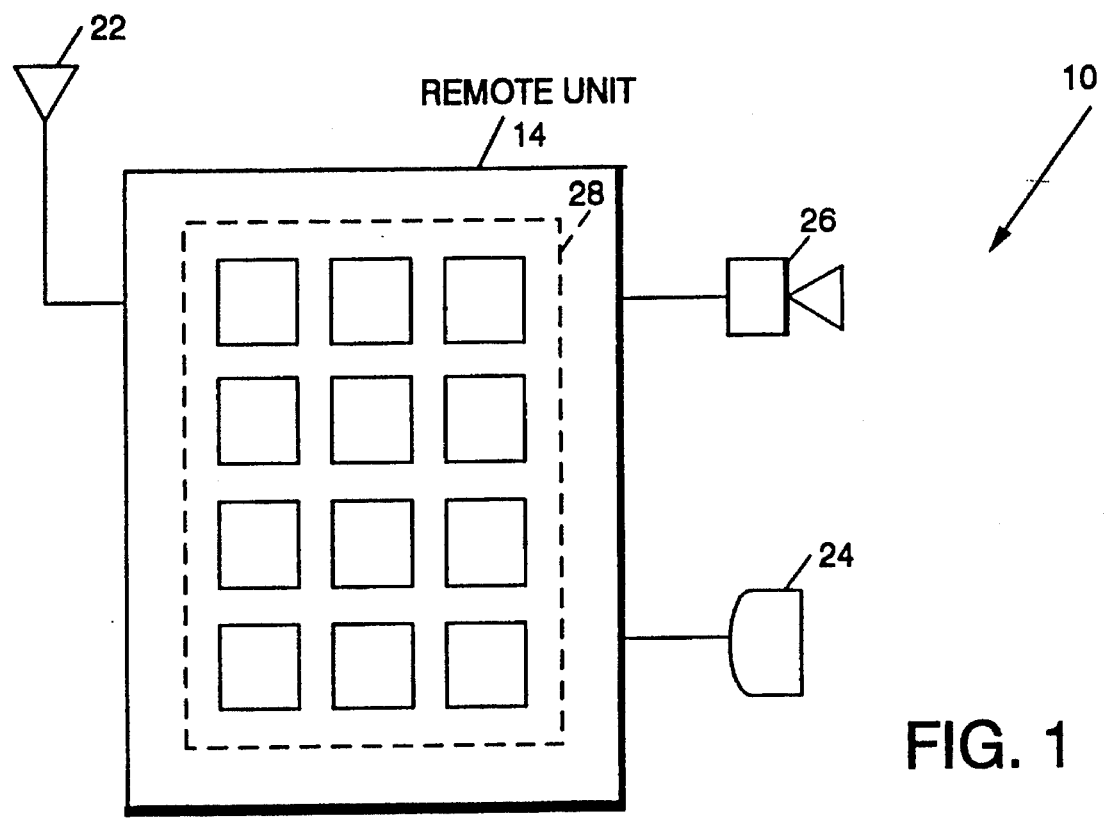
FIG. 1 is a block diagram of a communications system in accordance with a preferred embodiment of the present invention having first and second communications units.
Figure 1:
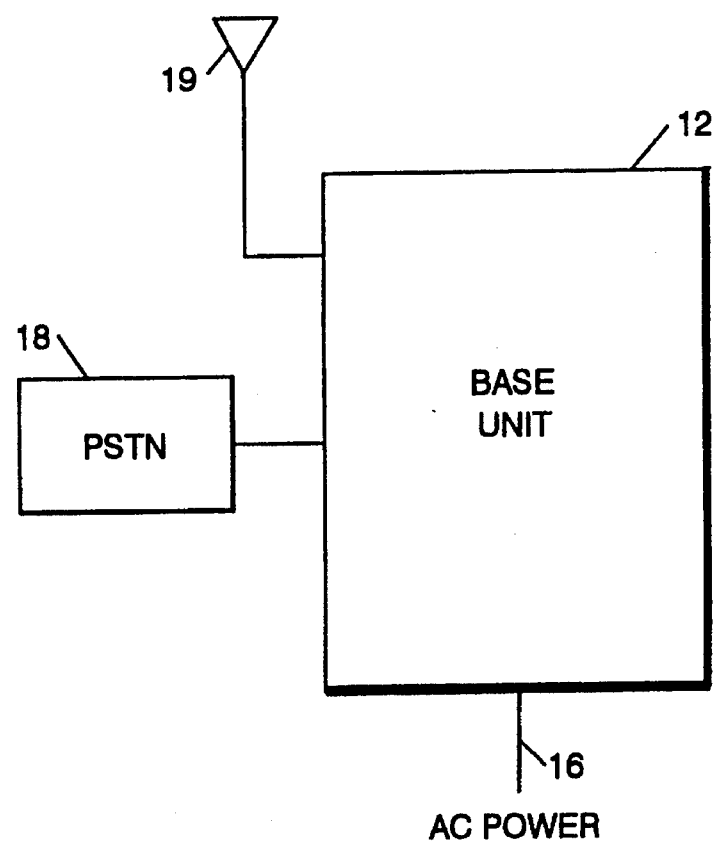
Figure 2A:
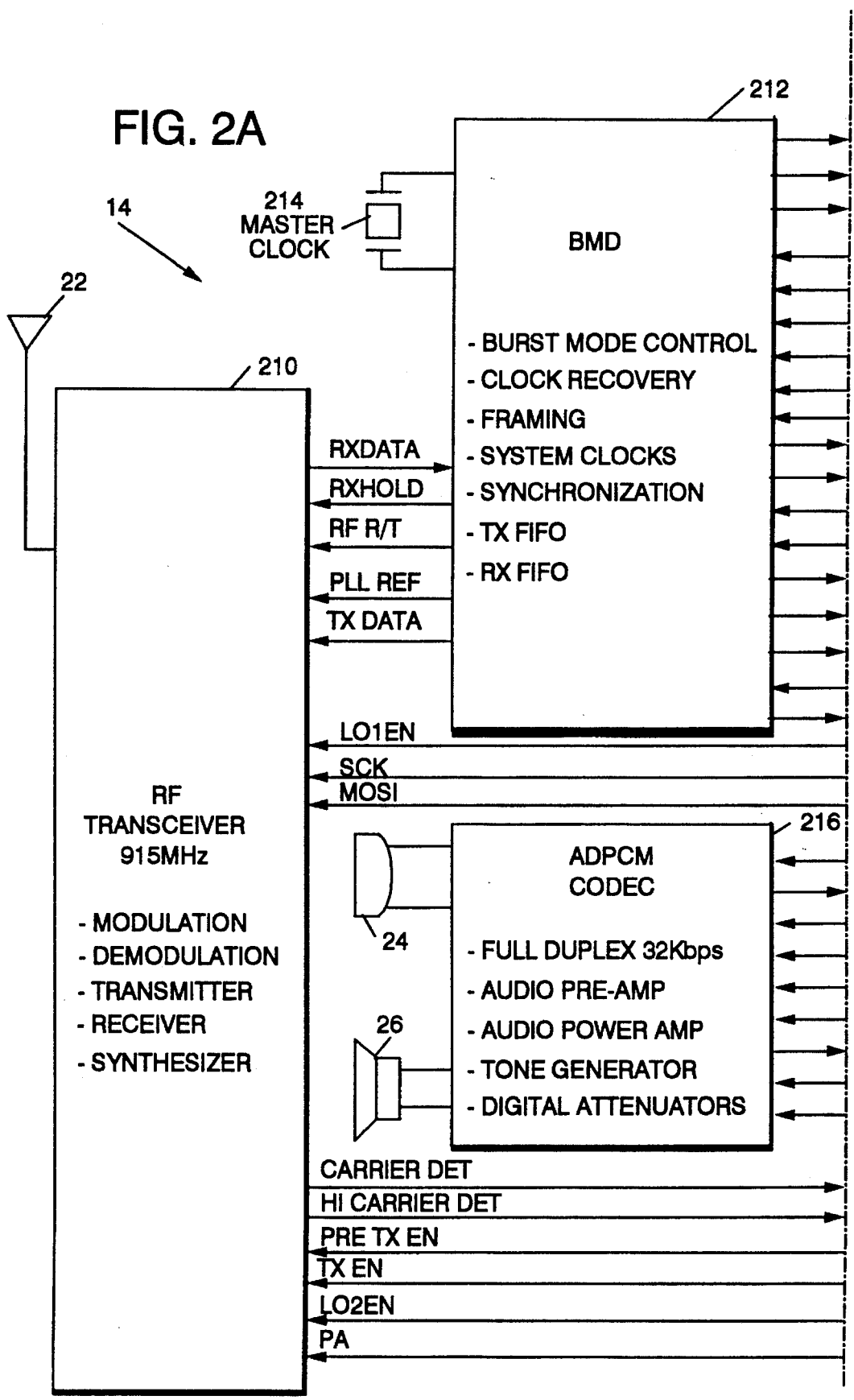

Referring now to FIG. 1, a communications system embodying the present invention will be described.

Communication system 10 includes a base unit 12 and a remote unit 14.

Base unit 12 receives its power from the alternating current power supply by the power utility on lines 16 and is connected to a public switching telephone network (PSTN) 18. Also, base unit 12 includes an antenna 19 for communications with remote unit 14. Remote unit 14 communicates with base unit 12 by transmission and reception of radio frequency signals through antenna 22. Remote unit 14 also may include a microphone 24 and a speaker or earpiece 26 for conversion of signals between sound and electronic form. In addition, remote unit 14 may also include a keypad of the DTMF type.

Figures 1, 3A:
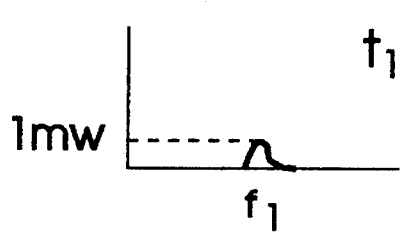
Figures 1, 3B:
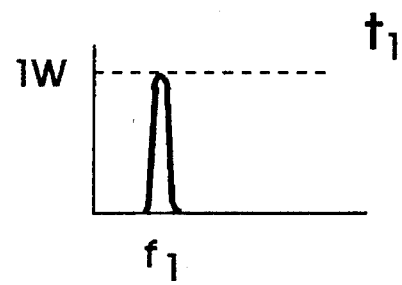
Figures 2, 3A:
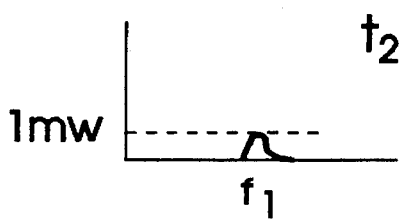
Figures 2, 3B:
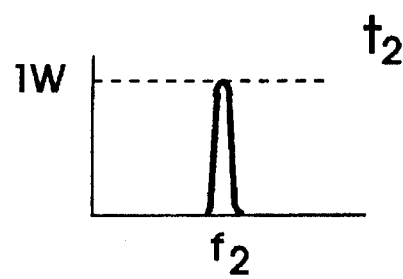

Referring now to FIG. 2, one unit of communication system 10, for example remote unit 14, will be described in greater detail.

It should be noted that the communications functions, including transmit power and frequency control described with reference to remote unit 14 will be the same for base unit 12. Base unit 12 may or may not include a keyboard 28 and most likely will not include a microphone 24 and an ear piece or speaker 26 as does the remote unit 14.

Remote unit 14 communicates with base station 12 through RF transceiver 210 which receives signals from and transmits signals to base unit 12 through antenna 22. The RF transceiver provides a frequency synthesizer, an RF receiver, an RF transmitter and modulation and demodulation functions in remote unit 14. Burst mode device 212 communicates with transceiver 210 to control burst mode operation to recover clock signals and to synchronize data frames between the base unit 12 and the remote unit 14. Burst mode unit 212 also controls sequencing and outputting of data from the Voice CODEC 216.

Voice CODEC 216 contains a Pulse Code Modulation (PCM) codec-filter. The term codec is an acronym from "COder" for the analog-to-digital converter (ADC) used to digitize voice and "DEcoder" for the digital-to-analog converter (DAC) used for reconstructing voice. A codec is a single device used for digitizing and reconstructing the human voice. Typically, the voice is quantized with an 8 bit word at a sampling rate of 8 kHz yielding a serial data rate of 64 kbps.

64 kbps PCM codecs are widely known in the art and are readily available from manufacturers such as Motorola, OKI of Japan and Texas Instruments.

The burst mode device (BMD) 212 has as a fundamental frequency control a master clock 214 which provides timing signals to permit the burst mode device 212 to generate clocking signals to other functional units in remote unit 14. BMD 212 provides bit timing and frame timing recovery. A digital phase lock loop (DPLL) within the BMD extracts the bit timing from the signal output of the receiver. The DPLL estimates the phase of the signal by measuring the time interval between zero crossings of the receive signal. With bit timing established, a correlator is used to detect the presence of a 24 bit unique word sequence embedded in the transmission stream. Detection of the 24 bit unique word identifies framing boundaries. Also embedded in the transmission stream is a 24 bit unique ID which prevents synchronization with an undesired system. BMD 212 uses the recovered frame timing to correctly position the transmit and receive bursts within the frame.

The operation of burst mode devices in time division duplex (TDD) applications is widely known in the art. They are used in second generation cordless telephone systems (CT2) and the Digital European Cordless Telecommunications (DECT) system. Burst mode devices for these systems are manufactured by Motorola, Philips and VLSI Technology.

Voice CODEC 216 converts sound information received by microphone 24 to electrical signals, amplifies the electrical audio frequency signals, and converts the audio frequency signals to digital representation by means of an analog to digital converter (ADC). Voice CODEC 216 also includes a digital to analog converter (DAC) for converting received information in digital form to analog form. An audio power amplifier amplifies the converted analog information and provides it to speaker 26 for conversion to sound for the user. A pulse code modulation technique is used in the ADC and in the DAC. The pulse trains are provided to the burst mode device 214 for storage in a transmit temporary storage device such as a FIFO buffer for transmission to transceiver 210 at an appropriate time to be transmitted in one or more transmission frames. Conversely, burst mode device 212 receives incoming data from RF transceiver 210 and stores the incoming data in pulse code format in a receive buffer which may be an FIFO buffer for transmission to the Voice CODEC 216 for conversion to an analog signal for amplification and conversion to sound in speaker 26.

The functions described above for remote unit 14 and similarly for base unit 12 are controlled by mode control unit 218.

Mode control unit 218 includes a microprocessor such as a model 6805C8 commercially available microprocessor, a random access memory 220, and a read only memory 222. Mode control unit 218 is connected to keypad 28 for entry of DTMF signals and to burst mode device 212, Voice CODEC 216 and to RF transceiver 210. MCU 218 controls all the functions in unit 14. For example, mode control unit 218 controls the phase lock loop (PLL) programming for transceiver 210, the frequency hopping pattern control, control channel signaling for synchronization, transmit power control for RF transceiver 210, mode control for RF transceiver 210 and other telephone features which are not significant to the present invention. Data related to mode control are stored in random access memory 220, which is a part of mode control unit 218, and bootstrap code and basic control code for microprocessor 6805C8 is stored in read only memory 222.

Frequency control coefficients for RF transceiver 210 are stored in random access memory 220 in mode control unit 218. A table in RAM 220 stores the pattern of frequency hopping which will control transceiver 210.

MCU 218 also interprets data in the form of received signal strength indicator (RSSI). The RSSI signal and signals indicating channel quality are used to determine if low power signal frequency transmission is sufficient to maintain quality communication or if higher power frequency hopping transmission is required to maintain communication over the communication channel.

OPERATION OF PREFERRED EMBODIMENT OF THE INVENTION

RF transceiver 210 includes a half duplex radio transceiver with variable transmitter power level and a received signal strength indicator (RSSI). A half duplex radio is required to implement time division duplex (TDD) transmission and reception. TDD enables full duplex wireless voice communication using a single radio frequency for both transmission and reception although at different times. Use of TDD also ensures link reciprocity thereby enabling accurate transmit power level adjustments based on received signal strength. A programmable synthesized local oscillator is incorporated in RF transceiver 210 to enable the operating frequency to be changed as often as once per data frame. A frame clocking signals is established through synchronization with the call originating unit of the communication such as base unit 12. Bit timing and frame synchronization are the functions performed by the burst mode device 212.

MCU 218 controls power level adjustments for RF transceiver 210 based on RSSI signals and the accurate reception of frame synchronization bits. The combination of the RSSI signal and the frame synchronization bits is used to monitor transmission channel quality.

Using the channel quality determined from the RSSI signal and the frame synchronization bits, the MCU 218 employs a variable mode control mechanism described in greater detail below with respect to FIG. 4 to determine if high power frequency hopping mode is required or if low power non-hopping mode can sustain adequate quality communication. Bit and frame timing are established independent of radio frequency or frequency hopping. To initiate high-power hopping mode, MCU 218 programs RF transceiver 210 frequency synthesizer to a different frequency once per data frame and increases the transmitter power to a level sufficient to maintain communications. Low power non-frequency hopping mode is set up by programming the synthesizer to use the same frequency for each data frame. The transmit power level in nonfrequency hopping mode is also reduced to a level below the one milliwatt limit established by the FCC.

Figures 3, 3A:
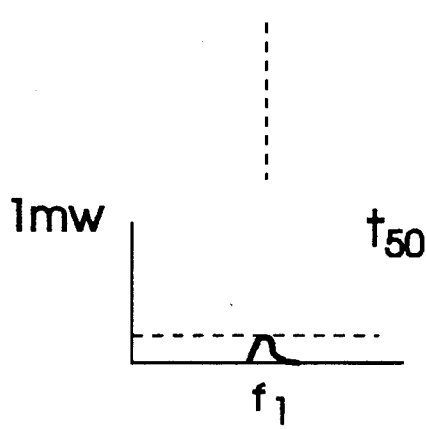
Figures 3, 3B:
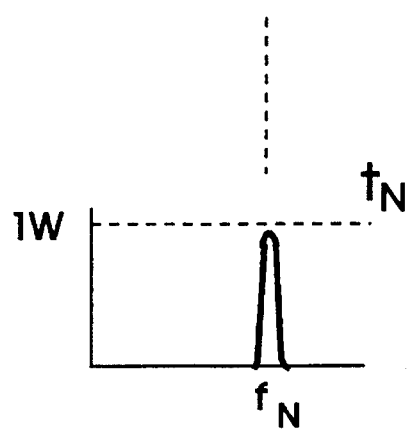

Referring now to FIG. 3, transmitter power output and frequency control will be described with respect to the graphic representations in FIGURES 3A and 3B.

FIG. 3A shows a sequence of fifty transmission frames at times T1, T2 ... T50, respectively, at a transmitter frequency of F1 for each flame, indicating a single frequency of transmitter output with a power level of a maximum of 1 milliwatt as indicated for each of the fifty frames in FIG. 3A.

In contrast, FIG. 3B shows fifty transmission frames T1, T2 ... T50 in which a frequency hopping frequency control is used with a maximum power output of the transmitter of one watt. For example, during frame T1 the transmitter may be operating on frequency F1 at a maximum power of one watt, while during frame Tn the transmitter may be operating on frequency Fn at a maximum power of one watt. The sequence of frequencies F1, F2 ... Fn are determined by the frequency table stored in random access memory 220 in MCU 218.

Control of frequency and power will be described in greater detail with respect to FIG. 4.

Figure 4A:
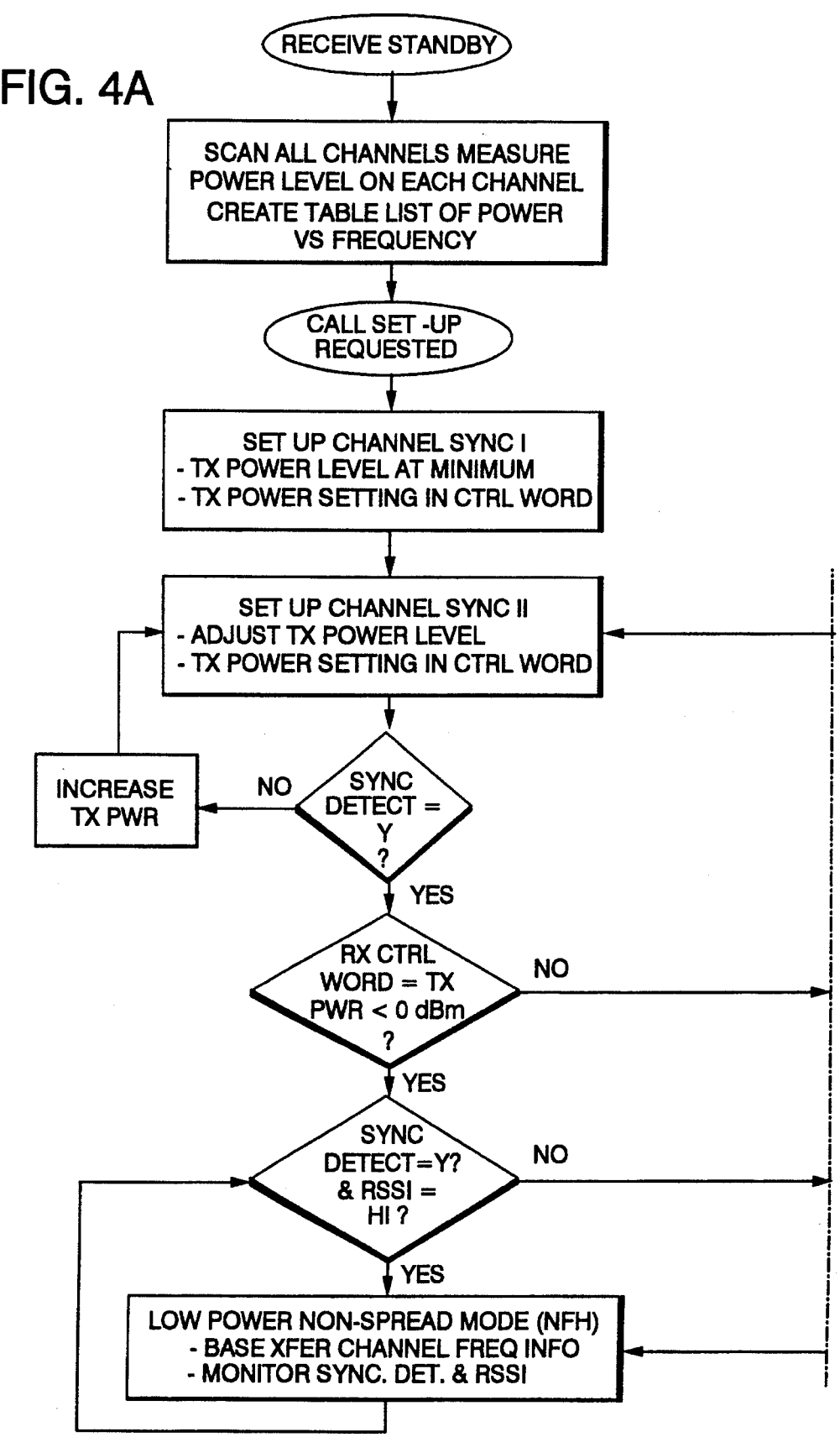

Referring now to FIG. 4, mode control, frequency control and power level control will be described in greater detail. At a first instance, remote unit 14 or base unit 12 is in a receive standby mode awaiting some interrupt condition to occur.

In the preferred embodiment of the present invention, 200 separate channels are available for communications or communications set up. Fifty channels are used for communications set up in both the high power and the low power mode. The designation of set up channels may be fixed or may change under control of the base unit.

Remote unit 14 receiver 210 and base unit 12 receiver 210 scan through each of the fifty set up channels and measure the RSSI on each channel. The hop time between channels is 100 us. Receiver 210 samples the RSSI for 50 us. If RSSI is above the minimum, receiver 210 remains on the channel to recover bit timing and verify a matching ID. If the ID does not match, receiver 210 proceeds to the next channel in the set up channel hop list and repeats this process. To maintain a 10% duty cycle, receiver 210 is disabled after 100 ms, for a period of one second in order to conserve battery life.

In addition to scanning the fifty set up channels, base unit 12 performs the RSSI measurement on the other 150 channels used by the system. Base unit 12 effectively maps the entire frequency band and compiles a hop table comprised of vacant channels.

When call set up is requested, the synchronization process must be performed. The call originating unit initiates transmission on the fifty set up channels with transmitter 210 at the maximum power setting of one watt. The transmission sequence consists of a series of dotting bits (one-zero transitions) for timing recovery, along with unique ID and a frame marking unique word. An acquisition frame consists of this pattern repeated for a total duration of 10.8 ms followed by a 3.3 ms receiving period used for detection of a response from the call receiving unit.

Upon detection of the call originating unit transmission, the call receiving unit transmits an acknowledgment message at the proper time and on the proper frequency in the hop pattern. Both units confirm synchronization by remaining on the original detection channel for an additional two frames. After successful confirmation, the tracking frame is substituted for the acquisition frame. The tracking frame consists of a 3.3 ms transmit burst and a 3.3 receive burst with guard times between each burst to allow for synthesizer settling and propagation delay. For each burst, a number of bits are used for control signaling. This control channel is used by base unit 12 for transfer to the remote, the status of each channel in the 200 channel hop table updated as a result of the spectrum mapping routine performed in the receive standby mode. Once this transfer is complete, the system initiates the hop sequence defined by the 200 channel hop table.

Also during this process, base unit 12 uses the RSSI and channel quality status (defined by the correct reception of frame synchronization bits) to determine if the remote is sufficiently close to permit low power nonfrequency hopping operation. If the RSSI value satisfies the requirement that RSSI >X+Y+Z where:

X equals the minimum allowable signal level that ensures an acceptable bit-error-rate (typically less than 1 error in 10,000 bits);

Y equals the remote unit transmitter power level relative to the 1 mW setting;

and Z equals the margin allowed for multi-path fading (typically 15 dB for portable, handheld radio applications), with good channel quality, base unit 12 directs the remote to initiate the nonfrequency hopping, low power mode. (Note: the value for Y is known to the base as a consequence of the base performing the system power control function.) Base unit 12 then provides the remote with the location of one of 200 voice channels previously determined by base unit 12 to be available.

Once the communications link has been successfully established, MCU 218 continuously monitors the RSSI signal and receive synchronization bits.

If the system is operating in nonfrequency hopping mode and remote unit is moved out of range, MCU 218 determines that a mode change may be required if RSSI falls below a predetermined operating threshold for a period longer than a predetermined number of frames such as 10. In this case, the power level is incremented in 10 dB steps and frequency hopping mode is initiated. The hopping pattern is based upon the spectrum map information recorded prior to call set up (above). Both remote unit 14 and base unit 12 increase the respective transmit power levels until RSSI enters a reliable operating range and synchronization bits are correctly received on all channels.

In the case of a sudden loss of synchronization bits with the RSSI signal above a minimum level, it is assumed that a jamming signal has been turned on on the frequency of the nonfrequency hopping signal. In the case of a sudden loss of the RSSI signal, it is assumed that remote unit 14 has rapidly moved out of range. Both units will remain on the channel in an attempt to re acquire communications and to characterize the nature of the jamming signals. If communications on the link resumes at a reliable level after a predetermined number of frames, such as 10, with RSSI in an acceptable range, no action need be taken. However, MCU 218 sets a timer in an attempt to detect the presence of another frequency hopping device. If the other frequency hopping device is a same kind unit, the time interval between frame hits will be predictable. Another frame hit anywhere within the timer interval will cause base unit 12 and remote unit 14 to enter frequency hopping mode at full power on the set up channels. If channel quality permits, transmit power levels of the base unit 12 and remote unit 14 can be reduced in steps, however, the frequency hopping mode is maintained for the duration of the call.

If synchronization is not reestablished during the timer interval, then the jammer is assumed to be a continuous carrier signal.

If no frame hits occur during the timer interval, then the jammer is assumed to be a continuous wave signal. Base unit 12 and remote unit 14 then jump to the next voice channel in the queue that was deemed available at the time of call set up. If the system is operating in frequency hopping mode, the nonfrequency hopping mode can be resumed only if the frequency hopping mode was initiated as a consequence of the remote unit 14 moving out of range or from an encounter with a nonfrequency hopping source. The nonfrequency hopping mode channel is determined by base unit 12 and is based upon the channel quality measured in the frequency hopping mode.

Although the present invention and its advantages have been described in detail, it should be understood that various changes, substitutions and alterations can be made herein without departing from the spirit and scope of the invention as defined by the appended claims.

What is claimed is:

1. A communications system comprising at least two communications units, each communications unit further comprising a transmitter and a receiver, said transmitter capable of transmitting at a plurality of output power levels and in a first mode on a single selected frequency and in a second mode hopping among a plurality of different frequencies, a control unit for controlling power level and frequency of transmission of each of said transmitters in response to indicators of transmission quality, and wherein said control unit switches said transmitter between said first and second modes in response to changing communications quality indicators.

2. A communications system according to claim 1 wherein said receiver further comprises means for receiving transmissions from said transmitter, means for demodulating said transmissions, means for recovering signals indicating communications quality, and means for switching said receiver between said first and second modes in response to said signals indicating communications quality.

3. A communications system according to claim 1 wherein said communication unit further comprises means for translating information between sound and digital form.

4. A communications system according to claim 1 wherein said communications unit further comprises means connected to said transmitter and to said receiver for recovering timing information and for synchronizing data transmissions between two or more communications units in said communications system.

5. A communications unit for use in a communications system having at least two said communications units, each said unit capable of transmitting signals in a frequency hopping mode, said unit comprising:

means for transmitting to another unit at a plurality of power levels and on a plurality of frequencies in said frequency hopping mode;

means for transmitting on a selected one of said frequencies at a power level which is the same or below a predetermined power level threshold;

means for monitoring communications quality and reliability;

means controlled by said monitoring means for controlling said power level to a level above said predetermined power level threshold and concurrently transmitting at said level above said predetermined power level threshold on a plurality of frequencies in said frequency hopping mode;

means for determining when reliable communications can be maintained at a power level at or below said predetermined power level threshold; and means controlled by said monitoring means for reducing said power level to a level at or below said predetermined power level threshold and for concurrently transmitting on a single frequency in a nonfrequency hopping mode.

6. A communications unit according to claim 5 wherein said transmission from one unit to another is accomplished in time divided frames wherein each frame includes a portion of data to be communicated plus a group of control bits; and wherein said monitoring means includes means for monitoring said control bits for a plurality of frames and for generating a control signal indicating whether said control bits are properly received for a predetermined number of frames.

7. A communications unit according to claim 5 wherein said means for controlling said power level includes means for establishing a frequency at which said unit will begin frequency hopping.

8. A method for communicating, between a plurality of communications units in a communications system, comprising the steps of:

determining frequencies available for reliable communications from predetermined group of frequencies;

establishing communications between a first and a second communications unit in said communications system;

setting a power level of a transmitter in said first communications unit at a first power level if communications may be reliably maintained on a single channel;

setting a frequency of transmission of said transmitter in said first unit to a frequency on which reliable communications may be maintained at said first power level;

periodically transmitting signals indicative of communications quality and reliability and receiving said signals by a receiver of said second communications unit in said communications system, said receiver demodulating said signals for controlling power output level and frequency of transmission of a transmitter in said second communications unit in response to said signals; and switching each said transmitter receiver pair of said communications unit from single frequency operation to a frequency hopping mode of operation if reliable communications may not be maintained with single frequency operation at transmitter power output level below a predetermined threshold.

9. A method according to claim 8 further comprising the step of:

increasing said power output level of said transmitter in predetermined increments when said signals indicating transmission quality indicate unacceptable quality of communications.

10. A method according to claim 8 further comprising the step of mapping transmission quality information of each channel available for communications in said communications system to create a table for selection of frequency of operation of said communications units.

11. A method according to claim 8 further comprising the step of establishing a transmitting frequency pattern for said frequency hopping mode of operation.

12. A communications system according to claim 1 wherein said control unit operates to raise said power output level to improve said quality indicators and wherein said control unit switches to said first mode when said power output level is at or below a certain preset level and switches to said second mode when said power output level is above said preset level.

13. A communications system according to claim 2 wherein the transmitter and receiver pair of each said two communications units interchange frequency availability data prior to establishing a communication session, such that said data is used during said communication session for synchronizing the frequency hopping patterns of said transmitter and receiver pair.

\* \* \* \* \*